US011436933B2

United States Patent
Monvoisin et al.

(10) Patent No.: US 11,436,933 B2
(45) Date of Patent: Sep. 6, 2022

(54) METHOD FOR IMPROVING A VIRTUAL REPRESENTATION OF AN AERODROME AND DISPLAY SYSTEM IMPLEMENTING SAID METHOD

(71) Applicant: THALES, Courbevoie (FR)

(72) Inventors: Emmanuel Monvoisin, Mérignac (FR); Olivier Gentil, Mérignac (FR); Guillaume Labarthe, Mérignac (FR)

(73) Assignee: THALES, Courbevoie (FR)

( * ) Notice: Subject to any disclaimer, the term of this patent is extended or adjusted under 35 U.S.C. 154(b) by 233 days.

(21) Appl. No.: 16/716,034

(22) Filed: Dec. 16, 2019

(65) Prior Publication Data
US 2020/0202728 A1     Jun. 25, 2020

(30) Foreign Application Priority Data
Dec. 21, 2018   (FR) ...................... 18 73844

(51) Int. Cl.
| G08G 5/02 | (2006.01) |
| G01C 23/00 | (2006.01) |
| G08G 5/00 | (2006.01) |
| G08G 5/04 | (2006.01) |

(52) U.S. Cl.
CPC .......... G08G 5/025 (2013.01); G01C 23/005 (2013.01); G08G 5/0021 (2013.01); G08G 5/0086 (2013.01); G08G 5/045 (2013.01)

(58) Field of Classification Search
CPC .... G08G 5/025; G08G 5/0021; G08G 5/0086; G08G 5/045; G01C 23/005
See application file for complete search history.

(56) References Cited

U.S. PATENT DOCUMENTS

| 2011/0095913 A1* | 4/2011 | Painter | .................. | G01C 23/00 340/972 |
| 2016/0200451 A1* | 7/2016 | Wang | .................. | G01C 23/005 701/16 |

OTHER PUBLICATIONS

French Search Report, from the French Patent Office in counterpart French Application No. 1873844, dated Oct. 24, 2019.

* cited by examiner

*Primary Examiner* — Maceeh Anwari
*Assistant Examiner* — Charles Pall
(74) *Attorney, Agent, or Firm* — ArentFox Schiff LLP

(57) ABSTRACT

This method consists in: obtaining the positions of the thresholds of the runways of the aerodrome; a runway model being a polygonal modeling of the runways, associating each runway with polygons, a portion common to two secant runways being represented by polygons common to the modelizations of the two secant runways; determining a correction plane of a terrain model located below the thresholds of the runways; defining a contour area around the runway model, based on the runway model and the correction plane; correcting a terrain model so that any point outside the contour area is projected onto the correction plane and any point within the contour area is projected onto the contour area; combining the corrected field model and the runway model to obtain an improved virtual representation.

6 Claims, 10 Drawing Sheets

METHOD FOR IMPROVING A VIRTUAL REPRESENTATION OF AN AERODROME AND DISPLAY SYSTEM IMPLEMENTING SAID METHOD

CROSS-REFERENCE TO RELATED APPLICATIONS

This application claims priority to French Patent Application No. 18 73844, filed on Dec. 21, 2018. The disclosure of the priority application is incorporated in its entirety herein by reference.

FIELD

The invention is generally concerned with devices and methods for creating a virtual representation of an aerodrome; the generation from this virtual representation and flight information of an aircraft, a synthetic view of the aerodrome and its surrounding terrain as of from the aircraft; and displaying the generated synthetic view on a screen installed in the cockpit of the aircraft to assist the pilot, particularly in the landing and take-off phases.

In this document, "virtual representation" is understood to mean a three-dimensional representation combining a model of the aerodrome terrain and a model of the set of runways of the aerodrome, i.e. the set of runways of an aerodrome with at least one runway.

The virtual representation consists of a plurality of points, the positions of which are defined, and with a texture for each surface element connecting a group of neighboring points.

In this document, "position of a point P" is understood to mean the position of this point according to three coordinates, X, Y and Z, for example, and preferably the two polar coordinates of longitude and latitude associated with the altitude coordinate.

BACKGROUND

FIG. 1 represents, schematically, a display system 1 on board an aircraft.

The display system is a computer comprising storage means and calculation means. The calculation means are suitable for executing the computer program instructions stored in the storage means.

The display system 1 comprises a screen 2 on which is displayed a graphic interface 3.

The graphic interface 3 superimposes in the foreground, navigation information 4 (such as for example the heading of the aircraft, the altitude of the aircraft or an artificial horizon), and, in the background, a synthetic view 5 of the surroundings of the aircraft, for example the aerodrome on which the aircraft will land.

Thus, in addition to the conventional navigation information, the pilot will be able to see on the screen 2, a reconstructed image of the runways of the aerodrome and the terrain surrounding these runways.

Currently during the approach phase, pilots have to rely only on traditional guidance information. The synthetic view is displayed only to increase awareness of the situation. In the case of a majority of approaches, the pilot must even identify the runway visibly at a height above ground level of generally around 200 feet.

In the near future, for these same approaches, and without this requiring specific ground equipment, it is planned that the pilot will be able to benefit from the input provided by such a graphic interface to reduce the altitude at which the pilot must identify the runway visibly, the target heights above ground being around 150 feet or 100 feet.

It is therefore essential to have reliable graphic representations in order to develop synthetic views to achieve this goal.

FIG. 2 represents real secant runways 10 and 20.

The runway 10 has a runway axis 100 defining the direction of the runway 10. The runway 10 may be used in one direction or the other. For example, runway axis 100 is oriented from left to right in FIG. 2, indicating a possible direction of use of the runway for a landing or take-off. According to this orientation of the runway axis 100, the runway 10 extends between an upstream threshold 11 and a downstream threshold 12. The runway extends laterally to a known width $L_{10}$. The surface of the runway has different markings allowing the pilot to identify the runway, the runway centerline, the upstream and downstream thresholds of the runway, etc.

There may be an offset runway threshold 13 (14) upstream of the upstream threshold 11 (respectively downstream of the downstream threshold 12). The offset runway threshold is marked by arrows leading to the corresponding threshold. This offset runway threshold is only used by taxiing aircraft for alignment with the runway centerline during take-off.

Finally, there may also be a blast pad 15 (16) marked by chevrons upstream of the upstream offset threshold 13 (respectively downstream of the downstream offset runway threshold 14). The surface of a blast pad is designed to withstand the blast of hot air produced by the engines of the aircraft positioned on the corresponding offset runway threshold. This blast pad is not intended for taxiing aircraft.

A similar description may be made for runway 20, of axis 200 and width $L_{20}$, which extends between upstream and downstream thresholds 21 and 22, and is associated with offset runway thresholds 23 and 24 and blast pads. 25 and 26.

In the present patent application, it is a question of modeling the runway as such, without taking into account possible offset runway thresholds or blast pads. In fact, the important information for the pilot is that relative to the runway, including the positions of the runway thresholds.

Prior art graphic representations are created from the contents of certified aeronautical databases. Such a database lists, for each aerodrome, the different runways of that aerodrome, and, for each runway of an aerodrome, the position of the central point of the upstream threshold and the downstream threshold of the runway, as well as the width of the runway. The runway axis passes through these two central points.

For example, for the runway 10 (respectively 20) of FIG. 2, the database includes the positions of the central points 101 and 102 (respectively 201 and 202) of the thresholds.

According to the prior art, the runway model of the set of runways of an aerodrome associates with each runway a rectangle, two opposing sides of which consist of the upstream and downstream thresholds of the runway.

The threshold here is rebuilt from the information in the aeronautical database used. For this, the right and left end points of a threshold, constituting two of the vertices of the rectangle modeling the runway, are obtained by horizontal translation, on either side of the runway axis, of the central point of the threshold, over a distance equal to half the width of the runway.

The modeling of each runway is therefore planar modeling.

This is illustrated in FIG. 3, which schematically represents a virtual representation RV' combining a terrain model MT' and a runway model MP' for an aerodrome comprising two secant real runways 10 and 20, which are each modeled by a virtual runway 10' and 20'.

However, with modeling of the runways by means of rectangles, the virtual representation RV' can present objects.

For example, while the actual runways 10 and 12 are secant, their modeling 10' and 20' in the form of rectangles can lead to them appearing one above the other at different altitudes in the virtual representation RV'. Such an object, called a "flying" runway, appears for example when the real terrain does not have a constant slope between the upstream and downstream thresholds of a runway. The modeling in the form of a planar rectangle passing through the thresholds then no longer constitutes a satisfactory approximation. Such a virtual representation is not acceptable because it can mislead the pilot: whereas according to the synthetic view developed from the graphic representation RV', the aircraft rolls along the virtual runway 20' and passes below the virtual runway 10', which thus seems to be "flying".

Another type of object may appear when combining the MP' runway model with the MT' terrain model and is due to all or part of the modeling of a runway being masked by the terrain model. This is illustrated in FIG. 3, where the points of the terrain model MT' having an altitude greater than those of the rectangle of the virtual runway 10' mask the latter. Here again, such a virtual representation is unacceptable and may mislead the pilot: in the case of FIG. 3, on the synthetic view developed from the virtual representation RV', the upstream threshold of the virtual runway 10' is masked by the terrain model MT' and the pilot can no longer see this threshold on the image displayed in the cockpit.

Finally, another type of object that may appear when combining the runway model MP' with the terrain model MT' is that all or part of the runway model is represented above the terrain model. This is illustrated schematically in FIG. 3 by means of the shadows of the virtual runways 10' and 20' projected on the terrain model MT'. Such a virtual representation is not acceptable and may also mislead the pilot.

Document US 2011/095913 A1 discloses an object correction method which provides for the identification of a mean correction plane located between the two thresholds of a runway, then the projection of a terrain model and a runway model on this correction plane. The final representation is therefore planar.

Such a method has the disadvantage of displaying a representation of the aerodrome which is not faithful with respect to the essential data, namely the altitudes of the runway thresholds.

The invention therefore aims to improve the virtual representation of an aerodrome to correct these objects and offer the pilot a synthetic view that is more consistent with reality.

SUMMARY

For this purpose, the object of the invention relates to a method for improving a virtual representation of an aerodrome, the virtual representation being used to generate a synthetic view intended to be displayed on a screen of an aircraft to help the pilot of the aircraft in the landing and take-off phases of said aerodrome, the virtual representation combining a model of the aerodrome terrain and a runway model of the set of runways of the aerodrome, said runway assembly including at least one runway, characterized in that the method comprises the steps comprising: querying a certified avionics database in order to obtain the positions of the two thresholds of each runway of the set of runways of the aerodrome; the runway model of the set of runways resulting from a polygonal modeling of the runways, associating each runway with one or more polygons, the polygons associated with the modeling of a runway being contiguous with each other, and a common portion of two "secant" runways being represented by one or more polygons common to the modelizations of the two secant runways; determining a terrain model correction plane, the correction plane being located below the runway thresholds of the set of runways of the aerodrome; defining a contour area around the runway model of the set of runways, the contour area bearing internally against the edges of the runway model, and externally against the correction plane; correcting an original terrain model to obtain a corrected terrain model so that any point outside the contour area is projected onto the correction plane and any point within the contour area is projected on a surface of the contour area; and combining the corrected terrain model and runway model to obtain an improved virtual representation.

According to particular embodiments, the method comprises one or more of the following characteristics, taken separately or in any technically feasible combination:

- the method comprises a step of generating a synthetic view from the improved virtual representation and navigation information of the aircraft, and then displaying the generated synthetic view;
- the method comprises the steps of: modeling each runway by a rectangular polygon whose two opposite edges are formed by the runway thresholds; then, determining a minimum distance between one runway and the other runways of the set of runways of the aerodrome; and finally, comparing the minimum distance with a reference distance, wherein the runway is said to be "remote" when the minimum distance is greater than the reference distance, and "close" when the minimum distance is less than the reference distance but strictly positive, or "secant" when the minimum distance is zero, the runway model being connected for remote or close runways and the contour area being connected for remote runways;
- the step of correcting an original terrain model to obtain a corrected terrain model only applies to points located within a contour defining the periphery of the aerodrome or to a smaller portion corresponding to the scope of a group of runways or the scope of an isolated runway;
- the correction plane is determined by minimizing a distance criterion between the correction plane and the thresholds of the runway assembly.

The object of the invention is also a display system suitable for implementing the above method, in particular for displaying a synthetic view developed from the improved virtual representation.

BRIEF DESCRIPTION OF THE DRAWINGS

The invention and its advantages will be better understood upon reading the detailed description which follows of a particular embodiment, given solely by way of illustration in a non-limiting example, the description being made with reference to the accompanying drawings, wherein.

DETAILED DESCRIPTION

Figure 1:
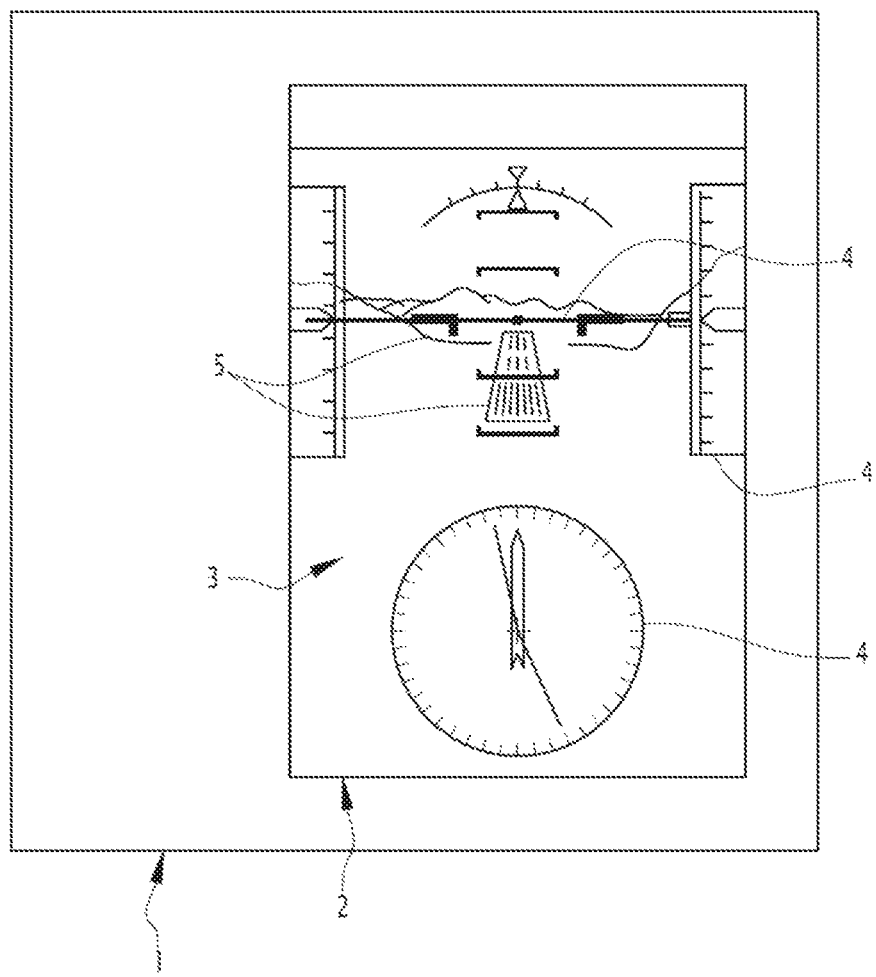
FIG. 1 shows a schematic representation of a display system for displaying a synthetic view generated from a virtual representation of an aerodrome.
Figure 2:
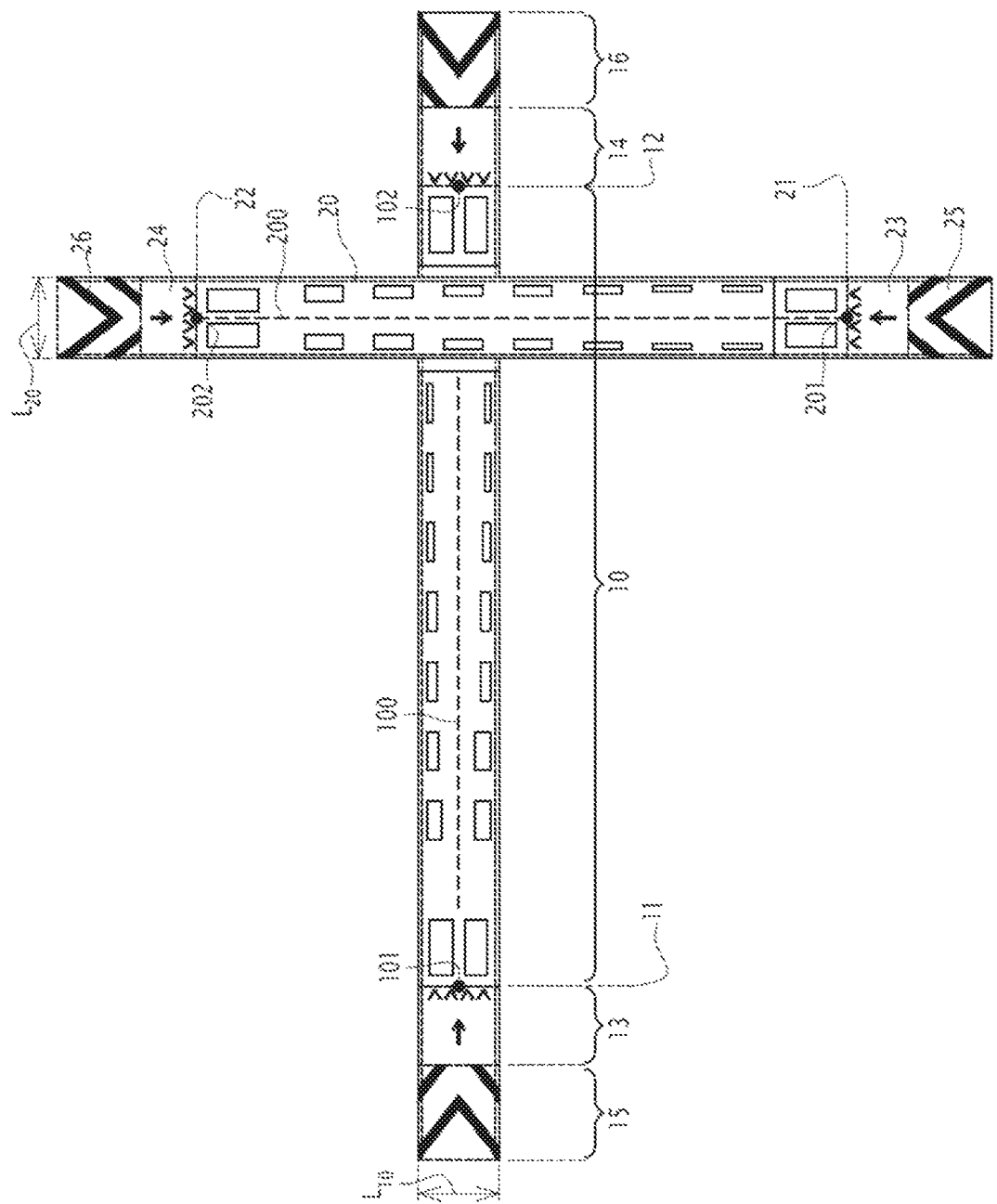
FIG. 2 shows a real aerodrome.
Figure 3:
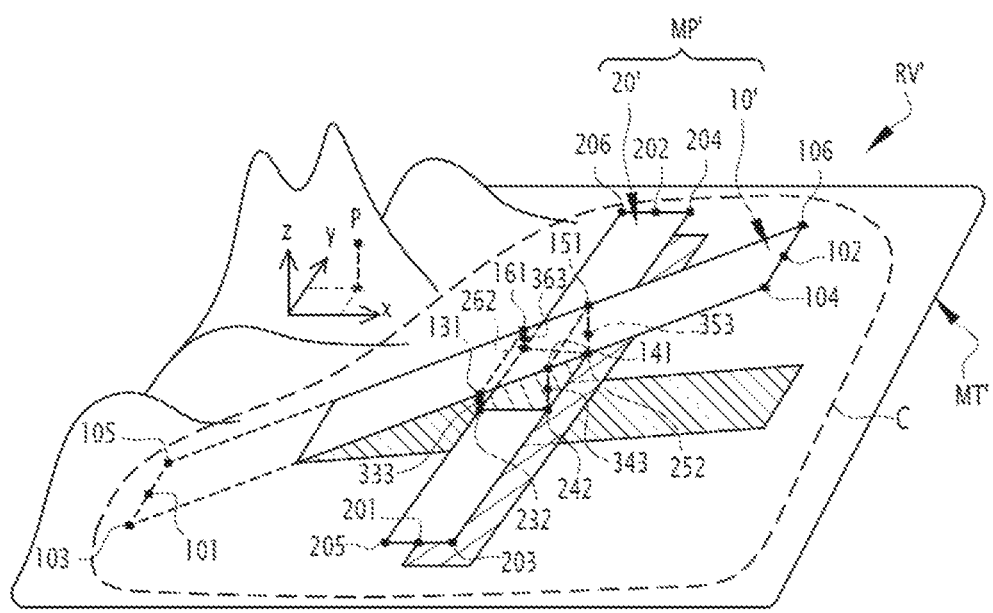
FIG. 3 shows a virtual representation of the aerodrome of FIG. 2 according to the prior art, affected by different defects or objects.
Figure 4:
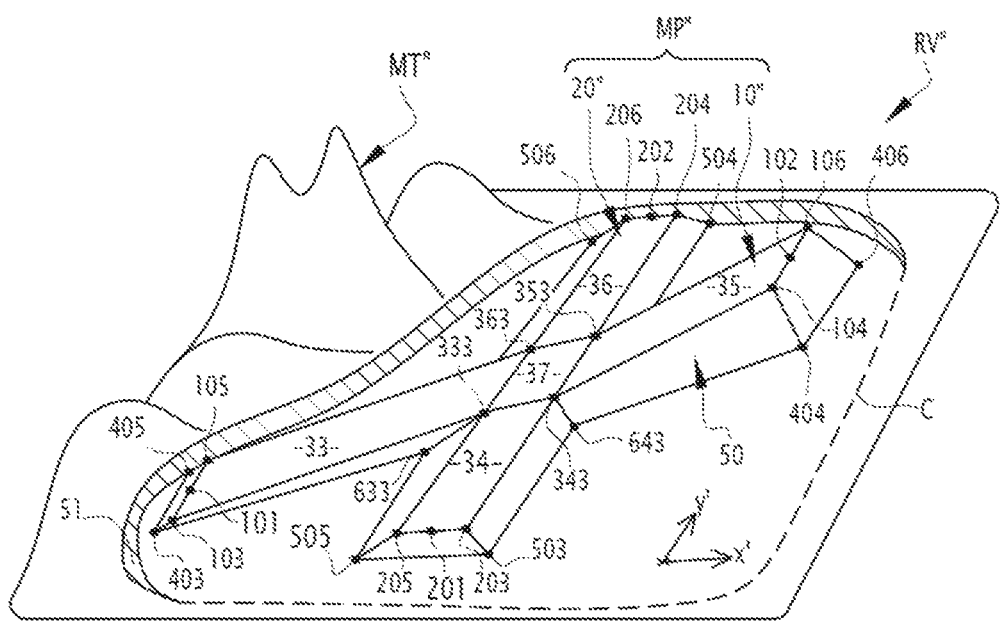
FIG. 4 shows an improved virtual representation of the aerodrome of FIG. 2 after implementation of the method according to the invention.

The general principle of the invention will be specified with reference to FIGS. 3 and 4.

To avoid the "flying" runway, the method consists in associating a polygonal runway model with the set of runways of an aerodrome. Each runway is then modeled by one or more polygons.

When a runway is modeled by several polygons, they are contiguous one with one another, i.e. two neighboring polygons have a common edge. For example, in FIG. 4, the virtual runway 10" results from the combination of the polygons 33, 37 and 35, while the virtual runway 20" results from the combination of the polygons 34, 37 and 36.

In the case of two secant runways, i.e. that have a common portion in reality, the virtual runways are developed to share at least one common polygon, the common polygon(s) corresponding to the common portion of these two runways.

For example, in FIG. 4, the virtual runway 10" and the virtual runway 20" share the common polygon 37, corresponding to the common portion of the real runways 10 and 20.

The common polygon is obtained by subdividing each runway into several polygons, then modifying the altitude of the vertices of these polygons so that they merge at least at the level of a polygon and thus become common. This alteration of the runway model is made under the constraint of not modifying the position of the runway thresholds as given by the certified avionics database used.

Thus, while in FIG. 3, the virtual runways 10' and 20' are represented at different altitudes, this object is corrected in FIG. 4.

To correct the object according to which all or part of the runway model is represented below the terrain model, the method according to the invention provides for the definition of a terrain model correction plane situated at an altitude that ensures that this correction plane is below the runway model. Advantageously, this correction plane is limited to the perimeter of the aerodrome.

Thus, while in FIG. 3, a portion of the virtual runway 10' is below the terrain model MT', in FIG. 4, the terrain model MT" has been corrected, at least on the inside of a perimeter C of the aerodrome, by projection on a correction plane X'Y' defined as passing below the runway model MP". It is thus certain that the virtual runways 10" and 20" will be entirely located above the terrain of the aerodrome in the virtual representation RV".

Finally, to avoid the object according to which the virtual runway(s) float(s) above the terrain, the method according to the invention defines a contour area around the runway model. The contour area is prismatic so that the faces of this prism connect an edge of a polygon of the runway model with the terrain model correction plane.

Thus, while in FIG. 3, the virtual runway 20' floats above the terrain model MT', in FIG. 4, a contour area 50 is defined around the virtual runway 20" (and the virtual runway 10"), whose prismatic shape makes it possible to join the runway model MP" with the corrected terrain model MT".

Figure 5:
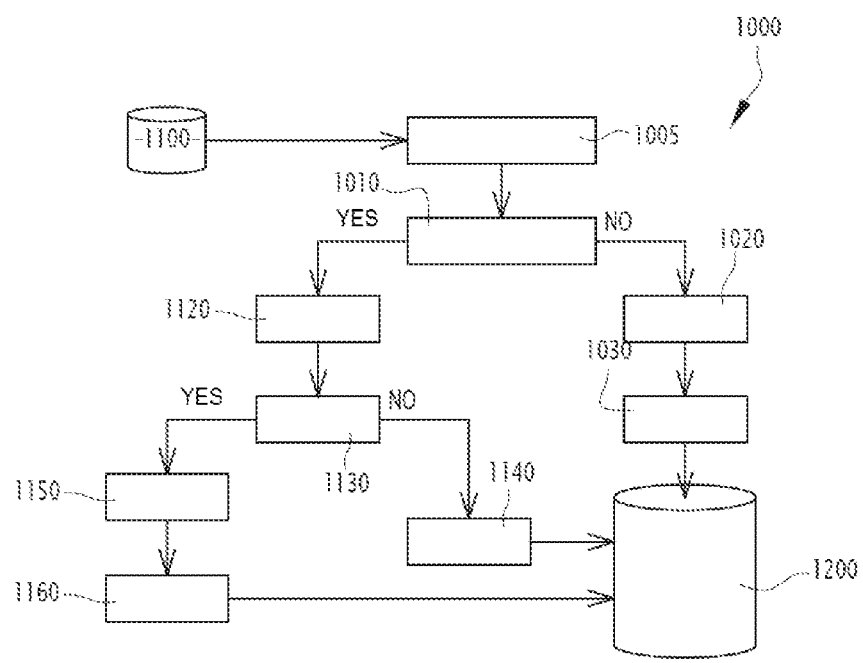
FIG. 5 shows a block representation of a first part of the method according to the invention.

The method according to the invention will now be more specifically described with reference to FIGS. 5 and 6.

The implementation of the first part 1000 of the method according to the invention is based on a certified avionics database 1100. The database 1100 comprises, for a set of aerodromes, the set of runways of each of these aerodromes, wherein the set of runways of an aerodrome comprise at least one runway; the database 1100 comprises, for each of the runways of the set of runways of an aerodrome, the position of the central point of the two thresholds of the runway and the width of the runway.

For the particular case of FIGS. 3 and 4, the set of runways of the aerodrome in question comprise two secant real runways 10 and 20.

The database 1100 then comprises the positions of the central points 101 and 102 of the thresholds of the first runway 10 and the positions of the central points 201 and 202 of the thresholds of the second runway 20, as well as the width $L_{10}$ of the first runway 10 and the width $L_{20}$ of the second runway 20.

In step 1005, for the aerodrome in question, the database 1100 is queried in order to extract the information relating to the set of runways of this aerodrome and to model each runway with a rectangular polygon.

From this information, the coordinates of the right and left end points of the upstream and downstream thresholds of a runway are determined. For this, the runway axis is determined as the line joining the two center points of the thresholds of the runway. Then, while maintaining the altitude coordinate of the central point of a threshold, the central point is translated horizontally perpendicularly to the direction of the runway axis on either side of the runway axis over a distance of half a runway width. From the four points obtained, the runway is modeled in the form of a rectangular polygon. For the moment therefore, the virtual runway is a planar object.

Thus, from the points 101 and 102 of the runway 10, the runway axis 100 is determined, then the end points 103 and 105 of the upstream threshold are determined from the point 101, by horizontal translation of $L_{10}/2$ perpendicular to the axis 100; the end points 104 and 106 of the downstream threshold are determined from the point 102, by horizontal translation of $L_{10}/2$ perpendicular to the axis 100. The virtual runway 10' is a rectangular polygon whose vertices are the points 103, 104, 106 and 105.

Similarly, the runway axis 200 is determined from the points 201 and 202 of the runway 20, then the end points 203 and 205 of the upstream threshold are determined from the point 201, by horizontal translation of $L_{20}/2$ perpendicular to the axis 200; and the end points 204 and 206 of the downstream threshold are determined from the point 202, by horizontal translation of $L_{20}/2$ perpendicular to the axis 200.

The virtual runway 20' is a rectangular polygon whose vertices are the points 203, 204, 206 and 205.

In step 1010, the minimum distance between one virtual runway and the other virtual runways of the set of runways of the aerodrome is calculated. This distance is evaluated in the horizontal plane XY, i.e. without taking into account the altitude of the points of the runways.

A runway will be said to be "remote" from the other runway(s) of the aerodrome when the minimum distance is greater than a reference distance.

A runway will be said to be "close" to another runway when the minimum distance is less than the reference distance while remaining strictly positive. This is the case of two close runways, without being secant.

Finally, a runway will be referred to as "secant" with another runway, when the minimum distance is zero. These two runways have in reality a common portion.

For the case shown in FIGS. 3 and 4, the minimum distance between the virtual runways 10' and 20' is zero, the runways 10' and 20' being secant.

If the calculated minimum distance is less than the reference distance, the method proceeds to step 1120. Otherwise, if this minimum distance is greater than the reference distance, the method proceeds to step 1020.

In step 1120, a correction plane common to this subset of runways is defined as several virtual runways are "close" or "secant".

Figure 7:
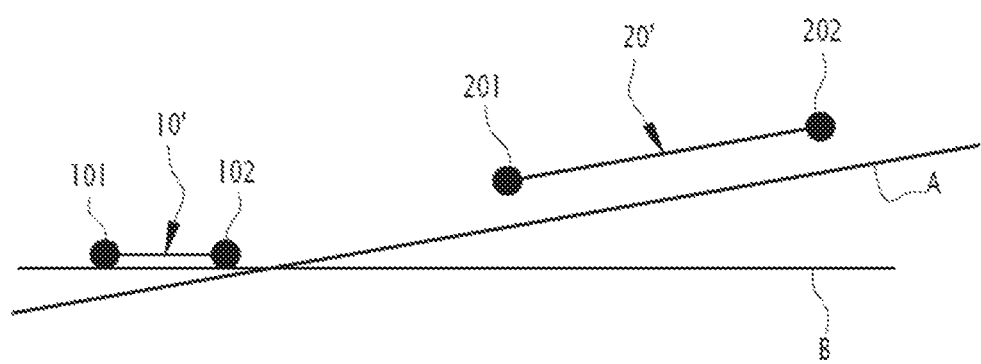
FIG. 7 shows a side view illustrating how to obtain a terrain model correction plane according to the method according to the invention.

As shown in FIG. 7, the common correction plane is chosen so that it is situated below the thresholds of the runways concerned. Advantageously, to limit the correction of the terrain model, the correction plane is determined so as to minimize a distance between the thresholds of the runway and the correction plane. Those skilled in the art know algorithms for optimizing the distance between a plane and different points.

Thus in FIG. 7, the correction plane A is to be preferred to the plane B, because although these two planes are below the different thresholds of the runways considered, the distance between the plane B and the thresholds is not optimal, a significant difference leading to a significant correction of the terrain model.

Once the correction plane has been defined, the method proceeds to step 1130.

In step 1130, based on the minimum distance calculated in step 1010, it is checked whether or not the virtual runways considered are secant or close to one another.

If the runways are only close to one another, the method proceeds to step 1140. On the other hand, if the runways are secant, the method proceeds to step 1150.

In step 1150, in the case of two secant runways, common points of intersection of the two virtual runways are first determined.

Figure 8:
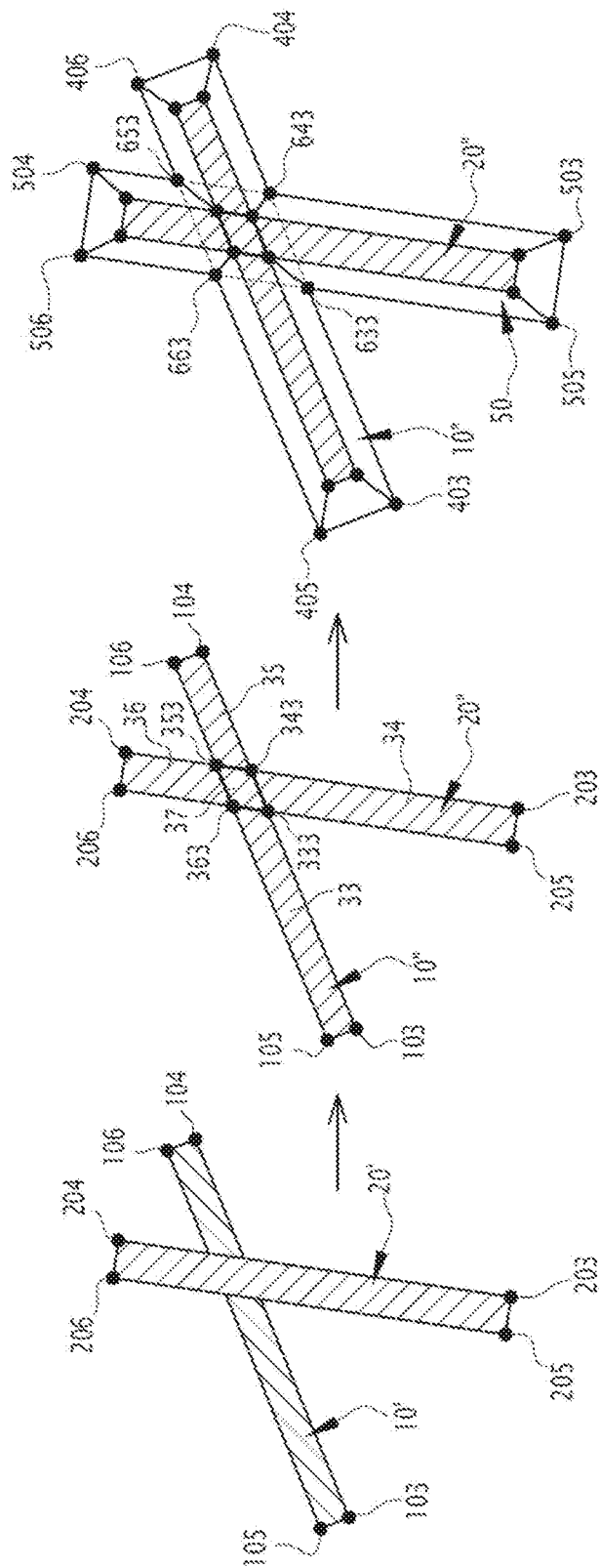
FIG. 8 shows a schematic representation in a plan view of two secant runways and the way to first obtain a polygonal modeling of all these runways and then of building a contour area around said modelization.

This step is illustrated in FIG. 8, which represents in plan view the two virtual runways 10' and 20'. In plan view, the two virtual runways are secant in a common portion, which is delimited by the common points 333, 343, 353, and 363.

As shown in FIG. 3, these common points correspond vertically and respectively to the points 131, 141, 151 and 161 of the first virtual runway 10' and to the points 232, 242, 252 and 262 of the second virtual runway 20'.

Given the geometry of the first virtual runway 10', the position of the points 131, 141, 151 and 161 is easily determined. Similarly, given the geometry of the second virtual runway 12', the position of the points 232, 242, 252 and 262 is easily determined.

Finally, the coordinates in the horizontal plane of the common point 333 are those of the corresponding points 131 and 232.

The altitude coordinate of the common point 333 is obtained by averaging the altitude of the corresponding points 131 and 232.

The position of each of the other common points 343, 353, and 363 is determined in an identical manner.

These common points are used to modify the modeling of each runway to represent it, no longer by a single rectangular polygon, but by a plurality of polygons whose vertices are the endpoints of the thresholds and the common points of the intersection portion.

The virtual runway 10" thus consists of three contiguous polygons 33, 37 and 35, the polygon 33 being defined by the vertices 103, 333, 363 and 105; the polygon 37 by the vertices 333, 343, 353 and 363; and the polygon 35 by the vertices 343, 104, 106 and 353. Similarly, the virtual runway 20" consists of three contiguous polygons 34, 37 and 36, the polygon 34 being defined by the vertices 203, 343, 333 and 205; the polygon 37 by the vertices 333, 343, 353 and 363; and the polygon 36 by the vertices 333, 204, 206 and 363.

Thus, two secant runways are modeled by a continuous surface, consisting of several polygons having at least one common polygon corresponding to the intersection portion of the two runways.

As a variant, the method of calculating the altitude of the common points defining the vertices of the common polygon may take into account a constraint in the form of a weighting if the common point concerned is close to the threshold of one of the runways, in order to avoid changing the altitude of the threshold of the runways.

In step 1160, a contour area is constructed around the continuous surface of the two intersecting virtual runways.

This step is shown on the right-hand part of FIG. 8, where a prismatic contour area 50 is built around the two virtual runways 10" and 20".

For example, in plan view, each vertex of the continuous surface joining the polygons of the two virtual runways 10" and 20" is moved away from this continuous surface, for example along a bisector between the edges of the continuous surface from the vertex considered.

Thus, point 403 is generated from point 103; point 405 from point 105; point 633 from point 333; point 663 from point 363; point 643 from point 343; point 653 from point 353; point 404 from point 104; point 406 from point 106; point 503 from point 203; point 505 from point 205; point 504 from point 204; and point 506 from point 206.

The longitude and latitude coordinates of each of these points are determined.

These points are then projected vertically on the X'Y' correction plane (FIG. 4).

The altitude coordinate of each of these points is determined.

The contour area 50 forms a prismatic surface whose faces connect an edge of the virtual runways to the correction plane.

This contour area makes it possible to ensure the continuity of the virtual representation between the virtual runways and the corrected terrain model.

In step 1140, when the virtual runways are close, the modeling of each of the close runways is not modified, and the runways are therefore represented by rectangular polygons, thus possibly being at different altitudes.

A single contour area is then built around close virtual runways.

As in step 1160, the contour area is prismatic.

It has internal faces connecting the edges closest to the two neighboring runways. It has external faces connecting the remaining edges of the virtual runways with the projection plane.

In step 1020, the virtual runway being considered "isolated" with respect to the other runways of the assembly of runways, a correction plane of the terrain model is defined. This correction plane is coplanar to the plane of the virtual runway.

In step 1030, a contour area is created around the isolated virtual runway. As in step 1160, the contour area is prismatic. Since the correction plane coincides with the plane of the rectangular polygon modeling the virtual runway, the contour area is here planar.

It should be noted that, in the case of an isolated runway among several runways or a runway close to another, the runway model is connected, i.e. it is composed of several continuous surfaces materializing the runways, these surfaces being independent of each other.

Similarly, in the case of an isolated runway among several runways, the contour area around the runway model is made up of several connected areas.

At the end of this first part 1000 of the method, the information obtained is stored in a database 1200. This relates to the correction plane, the runway model and the contour area around the runway model.

Figure 6:
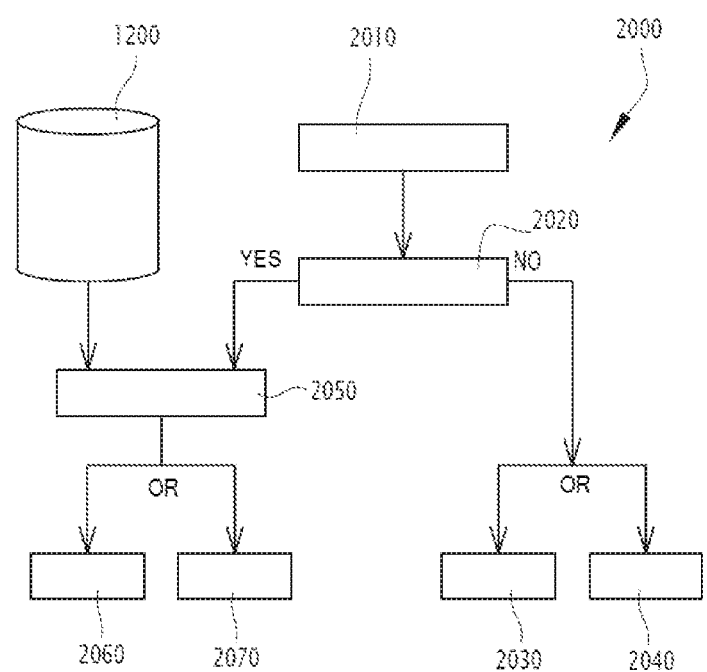
FIG. 6 shows a block representation of a second part of the method according to the invention.

Referring now to FIG. 6, in a second part 2000 of the method according to the invention, an original terrain model MT' modeling the aerodrome and its environment, is downloaded from an unrepresented external database.

Many field model databases are known with open access. Advantageously, several terrain models from different sources may be aggregated to constitute the terrain model MT' in order to improve the reliability of the terrain model used.

At step 2020, in order to generate a synthetic view to be displayed on the graphic interface of the display system, it is determined whether the geographical region of interest around the aircraft comprises an aerodrome.

If this query is answered in the negative, in step 2030, a synthetic view is generated from the virtual representation, which corresponds in this case to the original terrain model MT'. For this generation, the flight information of the aircraft is taken into account. The resulting synthetic view is displayed on the screen in the cockpit.

As a variant of step 2030, step 2040 makes it possible to store the virtual reconstruction in the storage means of the display system. This makes it possible to prepare a suitable virtual representation and to generate only the currently required synthetic view in real time.

On the other hand, if there are one or more runways within the geographical area of interest around the aircraft, at step 2050, the original terrain model MT' is corrected using the information contained in the database 1200.

Figure 9:
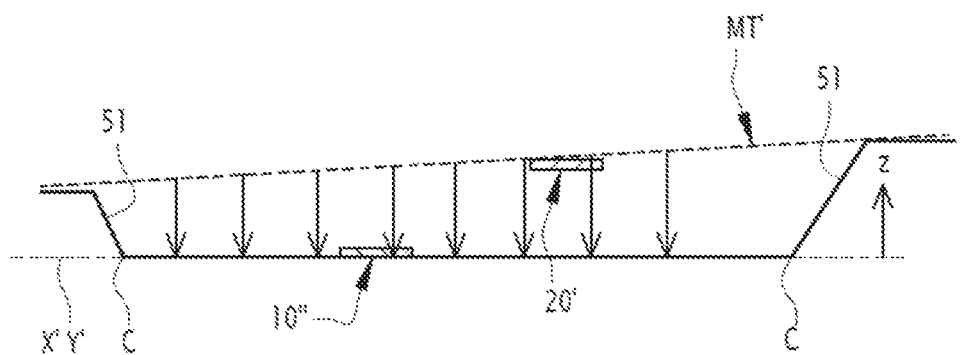
FIG. 9 shows an illustration in side view of the step of projecting the terrain model on the correction plane; and, FIG. 10 shows a side view of the projection step of the terrain model on the contour area defined around the runway modelization.

For this, as shown in FIG. 9, the points of the terrain model MT' are projected vertically on the correction plane X'Y'. By vertical projection (along the Z axis), is meant the modification of the altitude of a point of the terrain model MT' so that it adopts the altitude of the corresponding point of the correction plane X'Y', these points having the same coordinates of longitude and latitude.

Advantageously, the projection of the terrain model MT' is carried out only in a limited portion of the correction plane X'Y', this limited portion corresponding to the scope of the aerodrome or to a smaller portion corresponding to the scope of a group of runways or to the scope of at an isolated runway. It is delimited by a closed contour C defining the periphery of the aerodrome.

It is then advantageous to provide a connection surface 51 between the part that will not be corrected of the terrain model and the correction plane.

Figure 10:
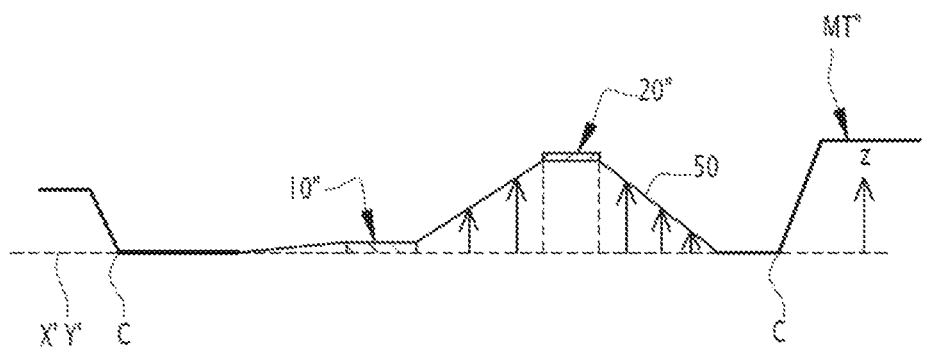

Then, in a second step, as shown in FIG. 10, the points which lie inside the contour area 50 around the runway model MP'' are projected vertically on the prismatic surface of this contour area.

At the end of these steps, a corrected terrain model MT'' is obtained.

An improved virtual representation RV'' of the aerodrome is finally obtained by combining the runway model MP'' and the terrain model corrected MT''.

This representation is continuous, not only between the virtual runways, but also between the virtual runways and the terrain model, the virtual runways being displayed above the corrected terrain model in all circumstances.

Advantageously, the runway model is associated with an appropriate texture and the corrected terrain model again adopts the texture of the original terrain model, in particular for the points projected on the correction plane and the points projected on the contour area.

As a variant, the texture associated with the contour area may be adapted to visually inform the pilot of the limits of the runways represented.

In step 2060, a view is generated from the improved virtual representation RV'' and flight information of the aircraft. The resulting synthetic view is displayed.

As a variant of step 2060, in step 2070, the improved virtual reconstruction RV'' obtained at the output of step 2050 is stored in a database. This makes it possible to build the improved virtual representation offline in order to generate only the synthetic view in real time.

The method just described is implemented in the form of a computer program executed by the display system 1. The storage means of the system 1 comprises the certified avionics database 1100 and the original terrain model MT'. Advantageously, to limit in flight the computing load only to generation of a synthetic view adapted from an improved virtual representation, the display system is able to execute the method while the aircraft is not in flight and to memorize the improved virtual representation obtained for its use in flight. Information from the flight plan is advantageously taken into account to develop an improved virtual representation only for geographic areas of interest given the mission.

Those skilled in the art will find that the information in the certified avionics database 1100 is not altered by the implementation of the method according to the invention. In particular, the positions of the thresholds of the runways are not modified.

The invention claimed is:

1. A method for improving a virtual representation of an aerodrome, the virtual representation being used to generate a synthetic view to be displayed on a screen of an aircraft to help a pilot of the aircraft in the phases of landing on and take-off from the aerodrome, the virtual representation combining an terrain model of the aerodrome and a runway model of a set of runways of the aerodrome, the set of runways comprising at least one runway, wherein the method comprises the steps of:

querying a certified avionics database in order to obtain positions of two thresholds of each runway of the set of runways of the aerodrome;

defining a correction plane of the terrain model, the correction plane being located below the thresholds of the runways of the set of runways of the aerodrome;

defining the runway model of the set of runways, the runway model of the set of runways resulting from a polygonal modeling of the runways which does not modify the positions of the thresholds of the runways of the set of runways of the aerodrome, by associating one or more polygons with each runway, the polygons associated with the polygonal modeling of one runway of the set of runways being contiguous with one another and a portion common to two secant runways of the set of runways being represented by one or more polygons common to the polygonal modelings of the two secant runways;

building a contour surface around the runway model of the set of runways, the contour surface being prismatic and bearing internally against edges of the runway model and externally against the correction plane;

correcting the terrain model to obtain a corrected terrain model, so that any point of the terrain model outside the contour surface is projected onto the correction plane, while any point of the terrain model within the contour surface is projected onto a surface of the contour surface;

combining the corrected terrain model and the runway model to obtain an improved virtual representation of the aerodrome.

2. The method according to claim 1, further comprising a step of generating a synthetic view from the improved virtual representation of the aerodrome and pieces of navigation information of the aircraft, and then displaying the synthetic view generated on a screen.

3. The method according to claim 1, further comprising the steps of:
   modeling each runway the set of runways with a rectangular polygon whose two opposite edges are constituted by the two thresholds of the runway;
   determining a minimum distance between a runway and another runway of the set of runways of the aerodrome;
   comparing the minimum distance with a reference distance, the runway being said to be "remote" when the minimum distance is greater than the reference distance, "close" when the minimum distance is less than the reference distance but strictly positive, or "secant" when the minimum distance is zero.

4. The method according to claim 1, wherein the step of correcting a terrain model to obtain a corrected terrain model relates only to the points of the terrain model located within a contour delimiting a periphery of the aerodrome or to a smaller portion corresponding to the set of runways.

5. The method according to claim 1, wherein the correction plane is determined by minimizing a distance criterion between the correction plane and the thresholds of the set of runways.

6. A display system comprising a certified avionics database and a memory storing a terrain model, wherein the display system is programmed to implement a method for improving a virtual representation of an aerodrome according claim 1 in order to produce an improved virtual representation of the aerodrome.

\* \* \* \* \*